(12) United States Patent
Chung et al.

(10) Patent No.: US 10,267,971 B2
(45) Date of Patent: Apr. 23, 2019

(54) LIGHT GUIDE FILM, BACKLIGHT MODULE AND DISPLAY DEVICE HAVING THE SAME

(71) Applicants: RADIANT OPTO-ELECTRONICS (SUZHOU) CO. LTD., Wujiang, Jiangsu (CN); RADIANT OPTO-ELECTRONICS CORPORATION, Kaohsiung (TW)

(72) Inventors: Yuan-Chen Chung, Kaohsiung (TW); Wei-Hsuan Chen, Kaohsiung (TW)

(73) Assignees: RADIANT OPTO-ELECTRONICS (SUZHOU) CO., LTD., Wujiang (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 15/295,004

(22) Filed: Oct. 17, 2016

(65) Prior Publication Data

US 2017/0045665 A1    Feb. 16, 2017

Related U.S. Application Data

(63) Continuation of application No. PCT/CN2015/099791, filed on Dec. 30, 2015.

(30) Foreign Application Priority Data

Aug. 14, 2015 (CN) .......................... 2015 1 0501831

(51) Int. Cl.
*F21V 8/00*    (2006.01)

(52) U.S. Cl.
CPC ......... *G02B 6/0018* (2013.01); *G02B 6/0028* (2013.01); *G02B 6/0038* (2013.01)

(58) Field of Classification Search
CPC .................................................... G02B 6/0076
(Continued)

(56) References Cited

U.S. PATENT DOCUMENTS

| 8,079,743 | B2 | 12/2011 | Bailey et al. |
| 8,402,647 | B2 * | 3/2013 | Chui .................. G02B 6/0036 362/611 |

(Continued)

FOREIGN PATENT DOCUMENTS

| CN | 101082739 A | 12/2007 |
| CN | 202041675 U | 11/2011 |

(Continued)

OTHER PUBLICATIONS

PCT/CN2015/099791 International Search Report dated May 9, 2016 (15 pages).

(Continued)

*Primary Examiner* — William J Carter
(74) *Attorney, Agent, or Firm* — Schwegman Lundberg & Woessner, P.A.

(57) ABSTRACT

A light guide film which is adapted for use with a light source has a light transmissive substrate and a light-transmissive member unit. The substrate has a light-exiting top surface, a bottom surface that is opposite to the top surface and a lateral surface that interconnects the top and bottom surfaces and that is adapted to face toward the light source. The member unit includes a bottom member that is disposed on the bottom surface of the substrate, and a lateral member that is connected to the lateral surface of the substrate and that is adapted to be disposed between the light source and the lateral surface of the substrate. The substrate has a refractive index which is less than that of the member unit.

14 Claims, 5 Drawing Sheets

(58) Field of Classification Search
USPC .......................................................... 362/616
See application file for complete search history.

(56) References Cited

U.S. PATENT DOCUMENTS

| | | | | |
|---|---|---|---|---|
| 2009/0195729 A1* | 8/2009 | Little | ................... | G02B 6/0053 349/64 |
| 2010/0020566 A1* | 1/2010 | Teng | .................... | G02B 6/0053 362/606 |
| 2011/0234941 A1* | 9/2011 | Gourlay | ............... | G02B 6/0041 362/612 |
| 2013/0070476 A1* | 3/2013 | Kunimochi | .......... | G02B 6/0083 362/606 |
| 2014/0355298 A1 | 12/2014 | Meis et al. | | |

FOREIGN PATENT DOCUMENTS

| | | |
|---|---|---|
| CN | 202075441 U | 12/2011 |
| CN | 202196197 U | 4/2012 |
| CN | 202733788 U | 2/2013 |
| CN | 103091766 A | 5/2013 |
| CN | 203324499 U | 12/2013 |
| CN | 103900031 A | 7/2014 |
| CN | 104597555 A | 5/2015 |
| CN | 104597556 A | 5/2015 |
| CN | 104748006 A | 7/2015 |
| CN | 204989528 U | 1/2016 |
| JP | 201135293 A | 10/2011 |
| TW | M490581 U | 11/2014 |
| WO | 2013073265 A1 | 5/2013 |

OTHER PUBLICATIONS

TW104129541 Taiwan Search Report dated Jul. 7, 2016 (2 pages).
"Taiwanese Application Serial No. 106101423, Office Action dated Jan. 24, 2019", (w/ Concise Statement of Relevance), 7 pgs.

* cited by examiner

LIGHT GUIDE FILM, BACKLIGHT MODULE AND DISPLAY DEVICE HAVING THE SAME

CROSS-REFERENCE TO RELATED APPLICATION

This application is a bypass continuation of International Application No. PCT/CN2015/099791 filed on Dec. 30, 2015, which claims priority of Chinese Patent Application No. 201510501831.1, filed on Aug. 14, 2015, the entire content of each of which is incorporated herein by reference.

FIELD

The disclosure relates to an optical element, more particularly to a light guide film, a backlight module having the same, and a display device having the same.

BACKGROUND

Referring to FIG. 1, a conventional light guide film 1 is adapted for use with a light source 2 for guiding light emitted therefrom. When the light emitted from the light source 2 enters the conventional light guide film 1, it will propagate within the conventional light guide film 1 by total internal reflection. However, since the conventional light guide film 1 is relatively thin comparing to the size of the light source 2, part of the light emitted from the light source 2 will not enter the conventional light guide film 1 and result in energy loss.

SUMMARY

Certain embodiments of the present disclosure provide a light guide film that may alleviate the aforementioned drawbacks of the prior art. Such a light guide film may be adapted for use with a light source and have a light-transmissive substrate and a light-transmissive member unit. The substrate has a light-exiting top surface, a bottom surface that is opposite to the top surface, and a lateral surface that interconnects the top and bottom surfaces and that is adapted to face toward the light source. The plastic member unit may include a bottom member that is disposed on the bottom surface of the substrate, and a lateral member that is connected to the lateral surface of the substrate and that is adapted to be disposed between the light source and the lateral surface of the substrate. The substrate may have a refractive index which is less than that of the member unit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
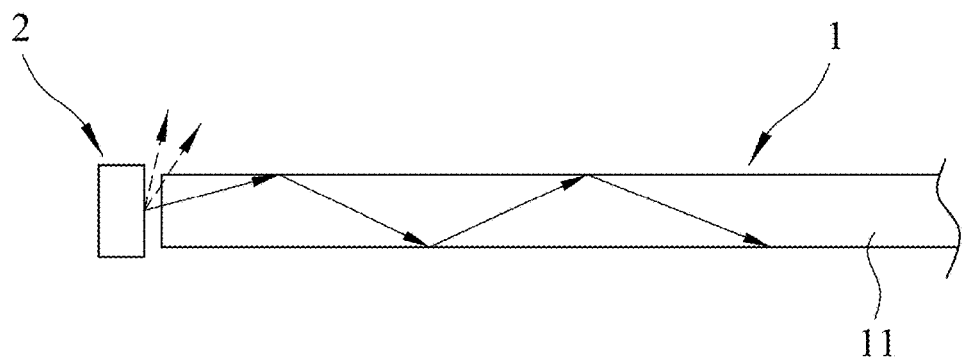
FIG. 1 is a schematic side view illustrating a conventional light guide film.

13Before the disclosure is described in greater detail, it should be noted that like elements are denoted by the same reference numerals throughout the disclosure.

Figure 2:
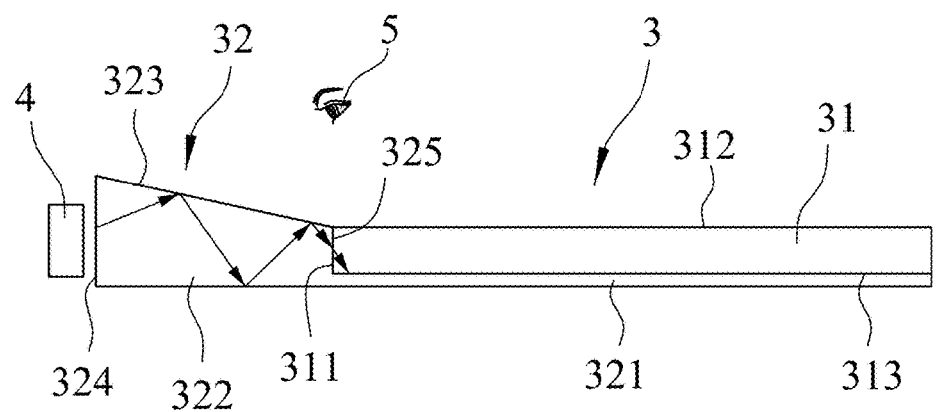
FIG. 2 is a schematic side view, illustrating a first exemplary embodiment of a light guide film according to the present disclosure.

Referring to FIG. 2, the first exemplary embodiment of a light guide film 3 according to the present disclosure, which is adapted for use with a light source 4, includes a light-transmissive substrate 31 and a light-transmissive member unit 32.

The substrate 31 of this embodiment has a light-exiting top surface 312, a bottom surface 313 that is opposite to the top surface 312, and a lateral surface 311 that interconnects the top and bottom surfaces 312, 313 and that is adapted to face toward the light source 4. As illustrated in FIG. 2, the lateral surface 311 of the substrate 31 is perpendicular to the bottom surface 313 of the substrate 31 in this embodiment. The substrate 31 may be made of a polymeric material, such as polycarbonate (PC) or polymethylmethacrylate (PMMA).

The member unit 32 of this embodiment includes a bottom member 321 that is disposed on the bottom surface 313 of the substrate 31, and a lateral member 322 that is connected to the lateral surface 311 of the substrate 31 and that is adapted to be disposed between the light source 4 and the lateral surface 313 of the substrate 31. In certain embodiments, the member unit 32 may be made from a UV-curable acrylate resin. In such embodiments, the member unit 32 may be formed by applying the UV-curable acrylate resin onto the substrate 31, placing a light-transmissible mold onto the UV-curable acrylate resin applied on the substrate 31, and curing the same with UV light. The bottom member 321 and the lateral member 322 may be integrally formed as one piece as illustrated in FIG. 2.

As shown in FIG. 2, the lateral member 322 of this embodiment is tapered toward the lateral surface 311 of the substrate 31 and has a light-incident lateral surface 324 that is adapted to face toward the light source 4, a connecting surface 325 that is opposite to the lateral surface 324 and that abuts against the lateral surface 311 of the substrate 31, and a top surface 323 that extends obliquely to meet with the top surface 312 of the substrate 31.

Figure 3:
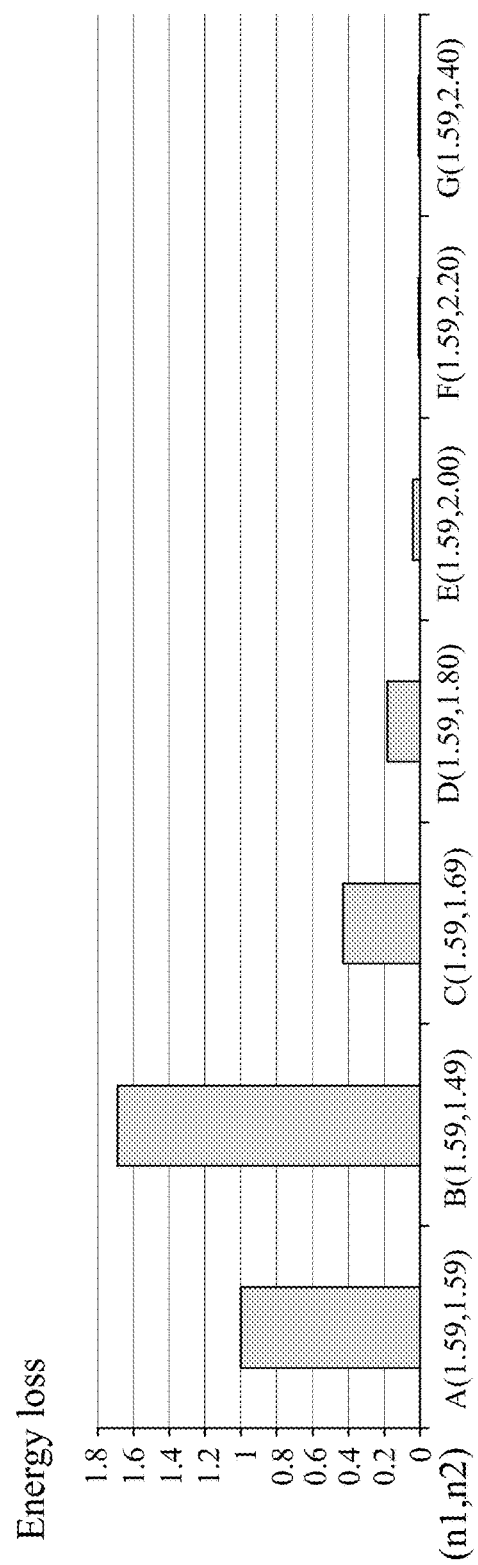
FIG. 3 is a bar graph of the first exemplary embodiment, illustrating energy loss of Examples (A) to (G)

The substrate 31 may have a refractive index ($n_1$) which is less than a refractive index ($n_2$) of the member unit 32. As illustrated in FIG. 2, when part of the light emitted from the light source 4 and incident into the light guide film 3 via the lateral surface 324 of the lateral member 32, it is desired to have total internal reflection occur at the top surface 323 of the lateral member 322 for reducing energy loss as light is transmitted through the light guide film 3. Since the refractive index ($n_2$) of the member unit 32 is larger than the refractive index ($n_1$) of the substrate 31 in this embodiment, there is a higher chance to have total internal reflection occur at the top surface 323 of the lateral member 322 and the bottom surface 326 of the bottom member 321, so as to effectively reduce energy loss of the light guide film 3. In certain embodiments, a ratio ($n_2/n_1$) of the refractive index ($n_2$) of the member unit 32 to the refractive index ($n_1$) of the substrate 31 may be greater than 1 and less than or equal to 1.5, i.e., $1<(n_2/n_1)\leq1.5$. Examples (A) to (G) in FIG. 3 shows the relationship between the ratio $(n_2/n_1)$ and the energy loss during the light transmission within the light guide film 3 observed from an observation point 5. Examples (A) to (G) respectively have the ratios $(n_2/n_1)$ of 1.0(1.59/1.59), 0.9 (1.49/1.59), 1.06 (1.69/1.59), 1.13 (1.80/1.59), 1.26 (2.00/1.59), 1.38 (2.20/1.59) and 1.51 (2.40/1.59), and the energy loss of each Example represented in FIG. 3 is scaled by being divided by the energy loss value obtained from Example 1. It is clearly shown that the observed energy loss varies as the ratio $(n_2/n_1)$ varies. When the ratio $(n_2/n_1)$ is greater than 1, e.g., Examples (C) to (G), the energy loss of the light guide film 3 is lower than that observed from Example 1, with the ratio being equal to 1. As the ratio $(n_2/n_1)$ increases and approaches 1.5, the energy loss of the light guide film 3 decreases accordingly. On the other hand, when the ratio is smaller than 1, e.g., Example (B), the energy loss is greater than that observed from Example (A).

Figure 4:
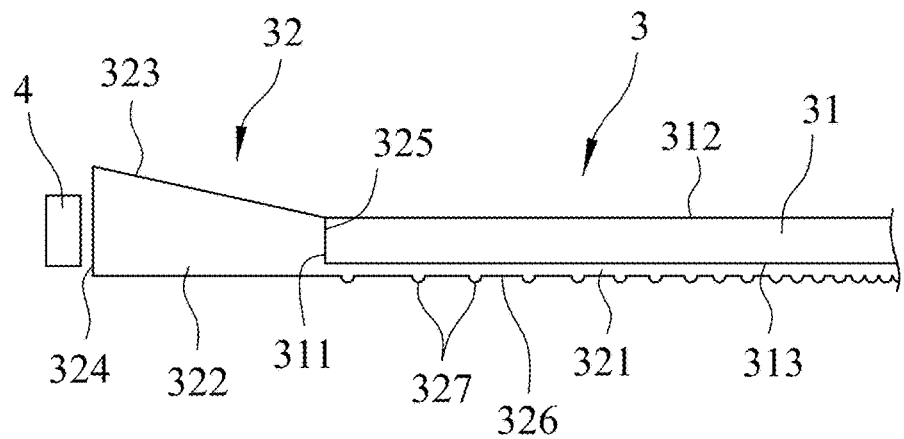
FIG. 4 is a schematic side view illustrating a second exemplary embodiment of the light guide film according to the present disclosure.

Referring to FIG. 4, the second exemplary embodiment of the light guide film 3 according to the present disclosure is shown to be similar to that of the first exemplary embodiment, with the differences residing as follows. As illustrated in FIG. 4, the bottom member 321 of the second exemplary embodiment has a bottom surface 326 that is opposite to the substrate 31 and that is formed with a plurality of microstructures 327. Each of the microstructures 327 may be configured as a protruding dot as illustrated in FIG. 4, but is not limited thereto according to the present disclosure. Total internal reflection may be hindered at the microstructures 327 on the bottom surface 326 of the bottom member 321 due to the varied incident angles, thereby allowing the light that propagates within the light guide film 3 to exit from the top surface 312 of the substrate 31. In certain embodiments, the microstructures 327 may have a surface density that is negatively correlated with a distance to the lateral member 322 as illustrated in FIG. 4, so as to increase the amount of light exiting from the top surface 312 at locations away from the light source 4.

Figure 5:
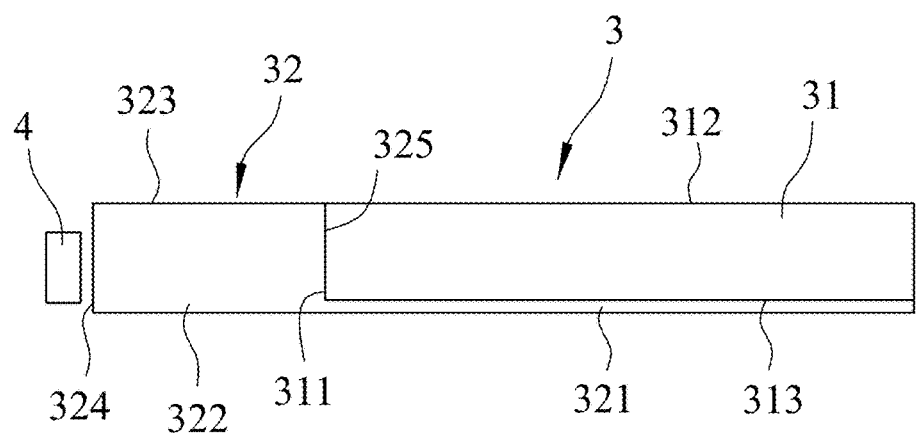
FIG. 5 is a schematic side view illustrating a third exemplary embodiment of the light guide film according to the present disclosure.

Referring to FIG. 5, the third exemplary embodiment of the light guide film 3 according to the present disclosure is shown to be similar to that of the first exemplary embodiment, with the difference residing in that the top surface 323 of the lateral member 322 meets with the top surface 312 of the substrate 31 in a co-planar manner. The light guide film 3 of the third exemplary embodiment has advantages similar to those of the first exemplary embodiment.

Figure 6:
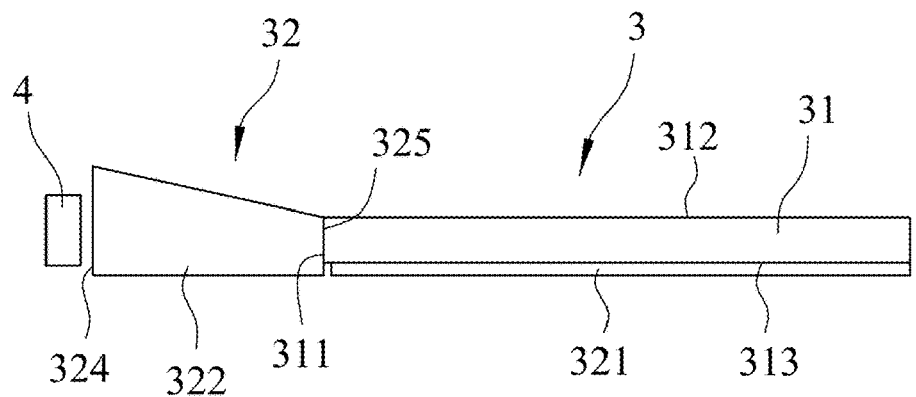
FIG. 6 is a schematic side view illustrating a fourth exemplary embodiment of the light guide film according to the present disclosure.

Referring to FIG. 6, the fourth exemplary embodiment of the light guide film 3 according to the present disclosure is shown to be similar to that of the first exemplary embodiment, with the difference residing in that the lateral member 32 and the bottom member 31 are configured as separate pieces which are not connected as illustrated in FIG. 6. The light guide film 3 of the fourth exemplary embodiment has advantages similar to those of the first exemplary embodiment.

Referring back to FIGS. 2 and 4 to 6, an exemplary embodiment of a backlight module according to the present disclosure may include the light source 4, and the aforesaid light guide film 3 as illustrated in either one of FIGS. 2, 4, 5 and 6 for guiding the light emitted from the light source 4 toward a direction and exited from the top surface 312 of the substrate 31. In certain embodiments, the lateral member 322 of the light guide film 3 may have an overall thickness that is not less than that of the light source 4, so as to ensure the light emitted from the light source 4 is substantially incident into the light guide film 3 via the light-incident lateral surface 324 of the lateral member 32. In certain embodiments, the substrate 31 may have a thickness that is less than that of the light source 4.

Figure 7:
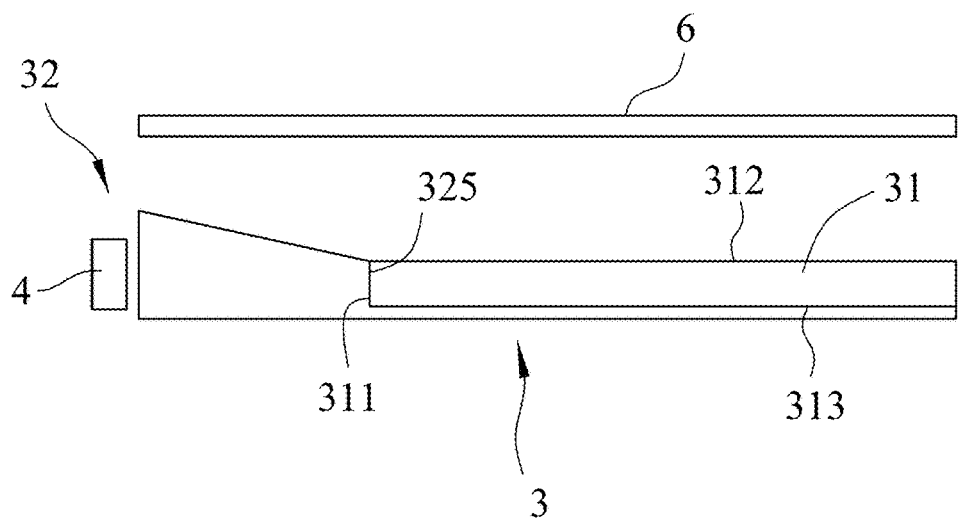
FIG. 7 is a schematic side view, illustrating one embodiment of a display device according to the present disclosure.

As illustrated in FIG. 7, one exemplary embodiment of a display device according to the present disclosure may include the backlight module, for instance, one as illustrated in FIG. 10, and a display panel 6 that is disposed to face the top surface 312 of the substrate 31, so as to receive the light exit from the top surface 312 of the light guide film 3 of the backlight module.

In summary, by virtue of the member unit 32 having desirable refractive index and by virtue of the configuration of the lateral member 322, the energy loss of the light guide film 3 according to the present disclosure can be effectively reduced.

Reference in the specification to "one embodiment," "an embodiment," "a first embodiment," "a second embodiment" and so forth means that a particular feature, structure, or characteristic described in connection with the embodiment may be included in at least an implementation. The appearances of the phrase "in one embodiment," "in this embodiment", "in the embodiment" in various places in the specification may or may not be all referring to the same embodiment. Various features, aspects, and exemplary embodiment(s) have been described herein. While various features and aspects may have been described with reference to different drawings depicting varying specific embodiments, the features, aspects, and exemplary embodiment(s) are susceptible to combination with one another as well as to variation and modification, as will be understood by those having ordinary skill in the art.

This disclosure is not limited to the disclosed exemplary embodiment(s) but is intended to cover various arrangements included within the spirit and scope of the broadest interpretation so as to encompass all such modifications and equivalent arrangements.

What is claimed is:

1. A light guide film adapted for use with a light source, comprising:

a light-transmissive substrate having a light-exiting top surface, a bottom surface that is opposite to said top surface, and a lateral surface that interconnects said top and bottom surfaces and that is adapted to face toward the light source; and a light-transmissive member unit including a bottom member that is disposed on said bottom surface of said substrate, and a lateral member that is connected to said lateral surface of said substrate and that is adapted to be disposed between the light source and said lateral surface of said substrate;

wherein said substrate has a refractive index which is less than that of said light-transmissive member unit;

wherein said substrate further has an end surface that is parallel to said lateral surface and interconnects said top and bottom surfaces;

wherein said lateral surface and said bottom surface of said substrate are contacted by said light-transmissive member unit;

wherein said lateral member has a light-incident surface that is adapted to face toward the light source, and a connecting surface that is opposite to and in parallel with said light-incident surface of said lateral member and that abuts against said lateral surface of said substrate without mediums between said connecting surface and said lateral surface;

wherein said light-exiting top surface and said end surface of said substrate are not contacted by said light-transmissive member unit; wherein a top of surface of said bottom member is planar and said bottom surface of said light transmissive substrate is planar.

2. The light guide film according to claim 1, wherein said lateral member is tapered toward said lateral surface of said substrate and has a top surface that extends obliquely to meet with said top surface of said substrate.

3. The light guide film according to claim 1, wherein said lateral member has a top surface that meets with said top surface of said substrate in a co-planar manner.

4. The light guide film according to claim 2, wherein said lateral surface of said substrate is perpendicular to said bottom surface of said substrate.

5. The light guide film according to claim 1, wherein a ratio of the refractive index of said light-transmissive member unit to the refractive index of said substrate is greater than 1 and is less than or equal to 1.5.

6. The light guide film according to claim 1, wherein said bottom member has a bottom surface that is opposite to said substrate and that is formed with a plurality of microstructures.

7. The light guide film according to claim 6, wherein said microstructures are configured as protruding dots.

8. The light guide film according to claim 6, wherein said microstructures have a surface density that is negatively correlated with a distance to said lateral member.

9. The light guide film according to claim 1, wherein said lateral member and said bottom member are integrally formed as one piece.

10. The light guide film according to claim 1, wherein said lateral member and said bottom member are separate pieces.

11. A backlight module, comprising:
    a light source; and
    said light guide film of claim 1 for guiding light emitted from said light source toward a direction where said top surface of said substrate faces.

12. The backlight module according to claim 11, wherein said lateral member has an overall thickness greater than or equal to that of said light source.

13. The backlight module according to claim 11, wherein said substrate has a thickness less than that of said light source.

14. A display device, comprising:
    said backlight module of claim 11; and
    a display panel disposed to face toward said top surface of said substrate.

* * * * *